April 20, 1926. 1,581,599
W. C. ROTH
POTATO GATHERER
Filed July 20, 1923 2 Sheets-Sheet 1

WITNESSES
INVENTOR
William C. Roth,
BY
ATTORNEYS

April 20, 1926.

W. C. ROTH

POTATO GATHERER

Filed July 20, 1923

1,581,599

2 Sheets-Sheet 2

WITNESSES

George O. Noyes

INVENTOR
William C. Roth,
BY
ATTORNEYS

Patented Apr. 20, 1926.

1,581,599

UNITED STATES PATENT OFFICE.

WILLIAM C. ROTH, OF LE ROY, NEW YORK.

POTATO GATHERER.

Application filed July 20, 1923. Serial No. 652,825.

*To all whom it may concern:*

Be it known that I, WILLIAM C. ROTH, a citizen of the United States, residing at Le Roy, in the county of Genesee, State of New York, have invented certain new and useful Improvements in Potato Gatherers, of which the following is a specification.

This invention relates to potato gathering device or implement.

The object of the invention is to provide an implement or device of the above character which may be attached to any conventional form of potato digger for receiving the potatoes and soil together with weeds and the like discharged from the potato digger.

It is also an important object of the invention that the present device operate to efficiently separate the earth and potatoes received from a potato digger with which the device may be associated or connected.

It is also within the scope of the objects of the invention that the device be exceedingly simple in construction and inexpensive to manufacture.

Other objects, and objects relating to details of construction, combination and arrangement of parts will hereinafter appear in the detailed description to follow.

Figure 1:
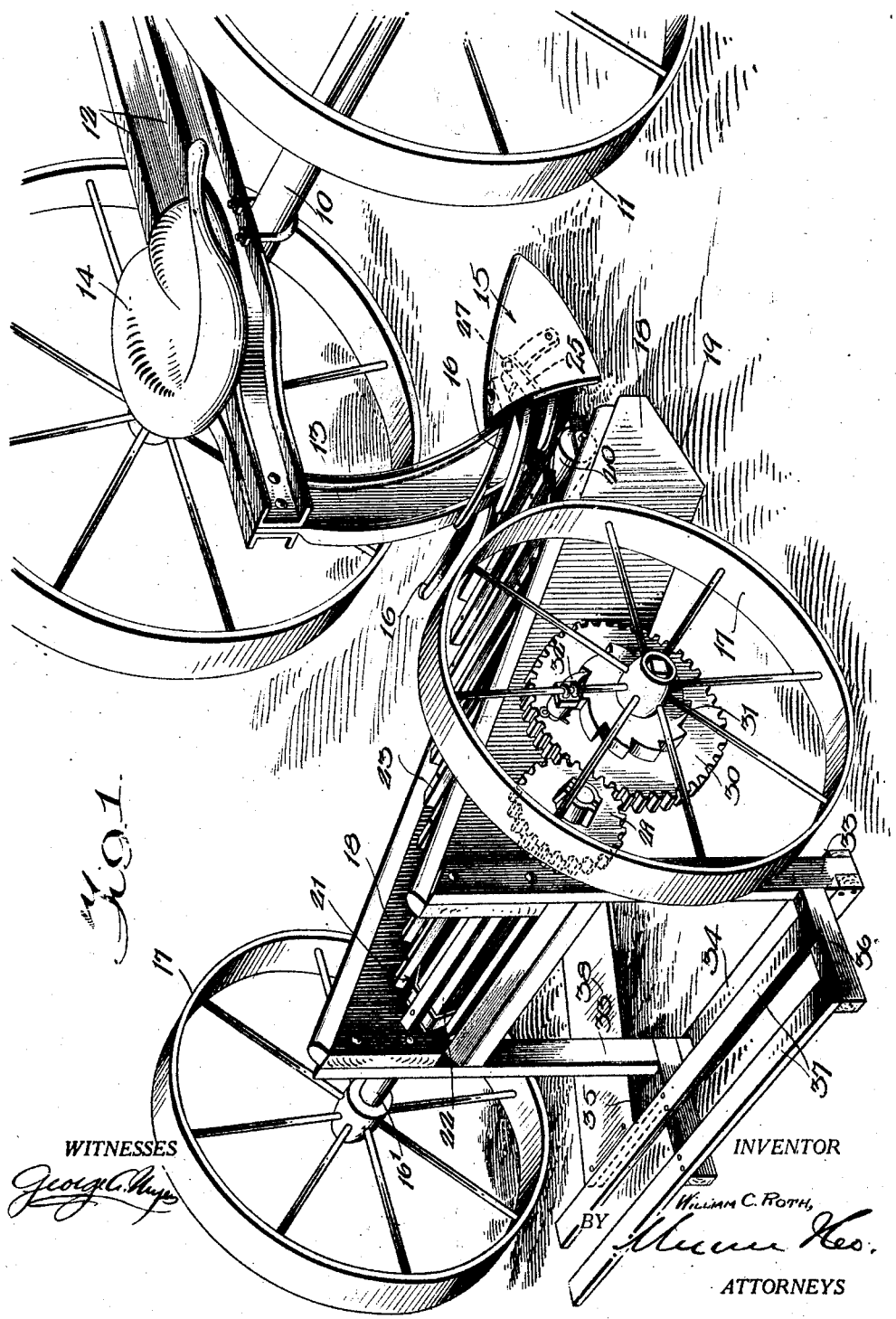
Figure 2:
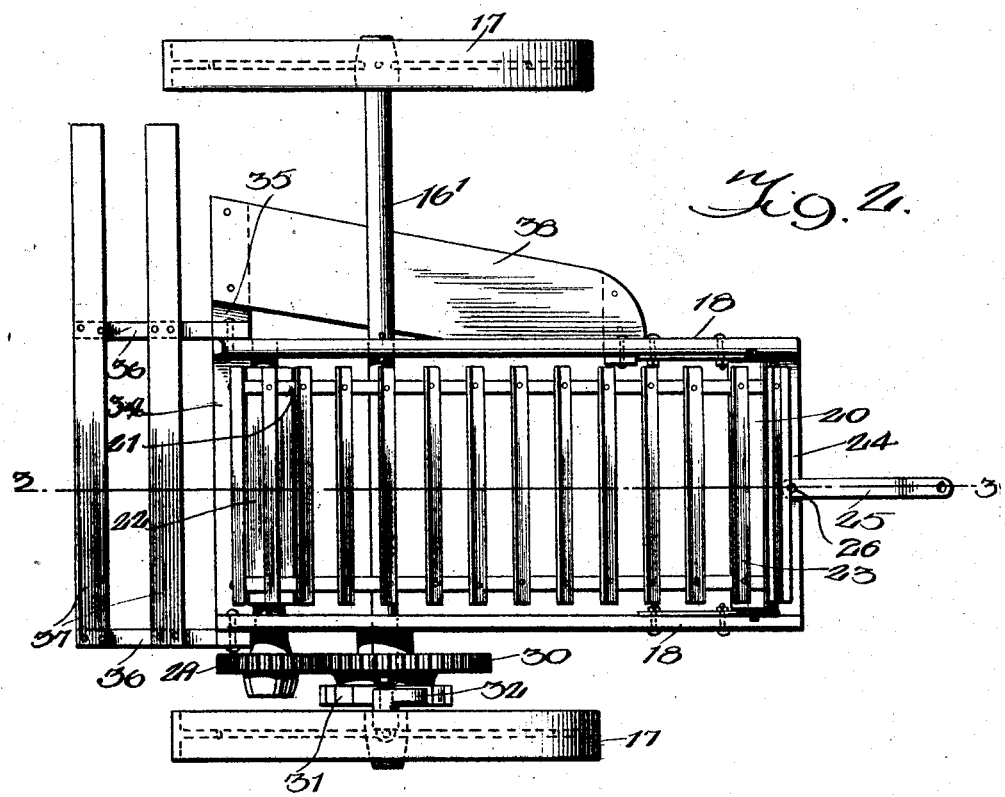
Figure 3:
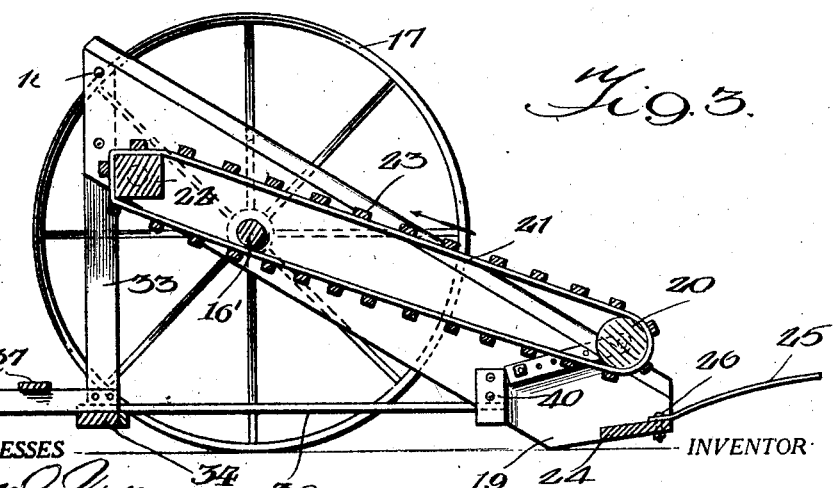

The invention is illustrated by way of example in the accompanying drawings, in which:

Figure 1 is a perspective view of the device and showing the same connected or secured to a conventional form of potato digger, Figure 2 is a top plan view of the potato separator, and Figure 3 is a vertical longitudinal sectional view of the same.

Referring to the drawings more particularly, the potato digger may comprise a suitable axle 10 supported by the wheels 11 and said axle in turn carrying suitable frame members 12 which may carry a plow standard 13 together with a seat 14. The plow standard 13 is adapted to carry a shovel or plow point 15 which has extending rearwardly therefrom prongs 16. This particular form of potato digger is of well known construction.

In carrying out the present invention there is provided an axle 16' which is supported by a pair of wheels 17. Upon this axle there is carried a pair of sideboards 18. These sideboards may have the axle journaled therein and are inclined, as shown. The forward end of each sideboard 18 is bevelled, as at 19. Between the forward ends of the sideboards 18 there is journaled a roller 20 over which passes a pair of continuous belts 21. These belts also pass over a roller 22 journaled between the rear ends of the sideboards 18, said roller 22 being square in cross section. The belts 21 carry a plurality of slats 23 which are suitably spaced with relation to each other in order to prevent potatoes passing therebetween. Between the forward ends of the sideboards 18 there is extended a brace member 24 which is preferably disposed as shown in Figure 3 and to which there is secured the one end of a strap 25 by the means of a bolt or the like, as at 26, and the other end of the strap is provided with a suitable opening through which a bolt may be extended and thus permit this end of the strap to be bolted to the lower side of the plow shovel 15, as indicated at 27 in Figure 1.

The roller 22 may be extended at its one side so that a cog wheel 29 may be secured to its shaft. This cog wheel meshes with a large cog wheel 30 which is loosely journaled upon the axle 16' and adjacent one of the wheels 17, as shown. This last-named cog wheel carries a ratchet 31 which is operatively engaged by a pawl 32 carried by one of the spokes of the associated wheel 17. The arrangement of the pawl 32 and ratchet 31 is such that rotative movement will be imparted to the cog wheel 30 with the forward movement of the potato digger and potato gatherer of the present invention and this rotative movement of the cog wheel 30 will operate the belts 21 in the direction for moving potatoes and dirt deposited thereon rearwardly with relation to the potato digger. The roller 22 will impart a vibratory motion to the belts 21 and slats 23 carried thereby, and in this way sift the dirt from the potatoes as the potatoes pass rearwardly.

The rear end of each sideboard 18 has depending therefrom supporting members 33 and between the lower ends of these supporting members there is secured a brace members 34 which has its one end extended, as at 35. Also from the lower end of each supporting member 33 there is extended an arm 36 and between the arms 36 there are supported the boards 37 whereby to provide a platform upon which crates or bags may be placed so that the same will be in position for receiving potatoes discharged from the conveyor or belt which includes the two belts 21 and the slats 23.

It will be noted that the wheel 17 carrying the pawl 32 is positioned in close relation to its associated sideboard 18, while the remaining wheel 17 is of a considerable distance from its sideboard 18. A board 38 is extended between the extension 35 of the brace member 34 and the forward end of the associated sideboard 18, said sideboard carrying a suitable bracket member, as at 40, whereby to support the forward end of the board 38. A person may stand upon the board 38 and pick all stones or other rubbish passing over the conveyor belt and thus eliminate the possibility of these stones and rubbish being deposited in the crate or bag with the potatoes.

In the use of the present apparatus or device one person may operate the potato digger and the potatoes and ground discharged from its prongs 16 will move upon the conveyor belt constituted of the belts 21 and the slats 23. As the potatoes and ground pass rearwardly upon this belt the same will be separated and the vibration of the conveyor caused by the squared roller 22 will greatly aid in this separation. A person standing upon the running board 38 may pick stones and other rubbish from the ground and potatoes when moving rearwardly and it has been found that the device will operate in an exceedingly successful manner for gathering potatoes.

While I have shown and described the preferred form of my invention, I wish it to be understood that I am aware of the fact that the construction, combination and arrangement of parts may be changed by those skilled in the art without departing from the spirit of the invention, as indicated by the appended claim.

I claim:

A potato gathering attachment for potato diggers, comprising a pair of wheels, a frame including a pair of side boards supported between the wheels with the greater portion of the side boards extending forwardly of the wheels and the forward ends thereof beveled to engage and slide upon soil over which the same may be drawn, a brace between the forward ends of said side boards, and a strap secured at one end to the longitudinal center of the brace and its other end adapted to be secured to a potato digger.

WILLIAM C. ROTH.